Figure 1:
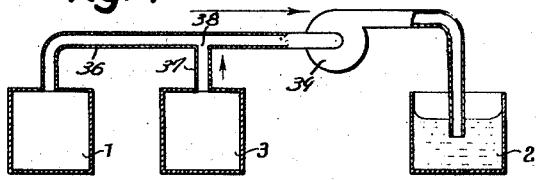

March 21, 1939. R. AUERBACH 2,151,547

METHOD FOR THE PRODUCTION OF DISPERSE GASES IN LIQUIDS

Filed May 8, 1935 2 Sheets-Sheet 1

Inventor:
Rudolf Auerbach,
by Harry E. Dunham
His Attorney.

March 21, 1939.  R. AUERBACH  2,151,547
METHOD FOR THE PRODUCTION OF DISPERSE GASES IN LIQUIDS
Filed May 8, 1935  2 Sheets-Sheet 2
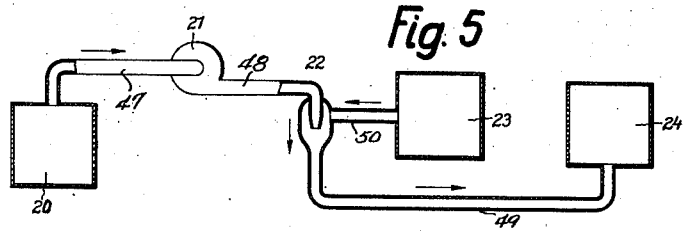
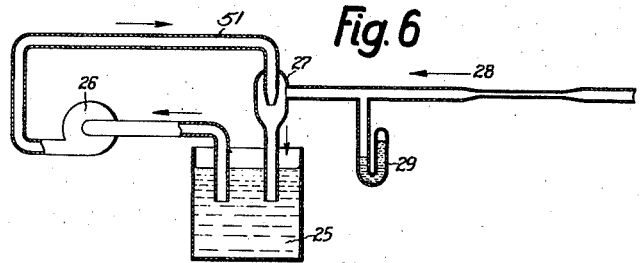
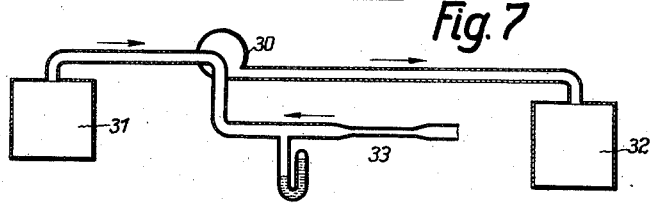
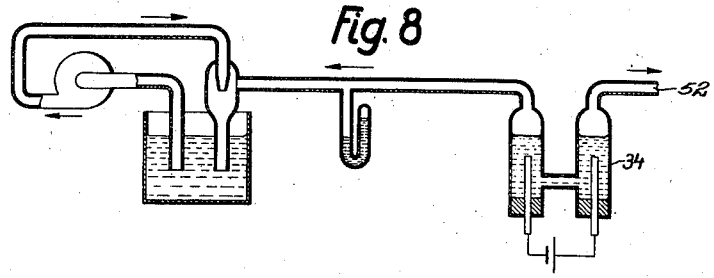
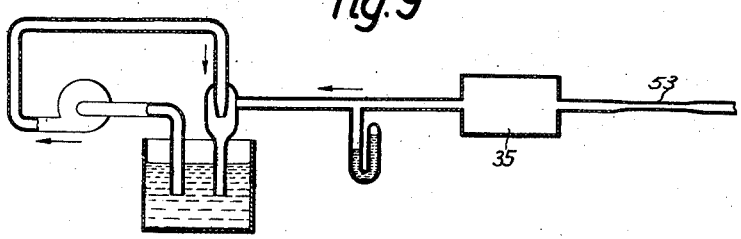
Inventor:
Rudolf Auerbach,
by Harry E. Dunham
His Attorney.

Patented Mar. 21, 1939

2,151,547

UNITED STATES PATENT OFFICE 2,151,547

METHOD FOR THE PRODUCTION OF DISPERSE GASES IN LIQUIDS

Rudolf Auerbach, Neuenhagen, near Berlin, Germany, assignor to General Electric Company, a corporation of New York Application May 8, 1935, Serial No. 20,346
In Germany May 8, 1934

12 Claims. (Cl. 261—77)

The present invention relates to, and has as a principal object to provide certain improvements and modifications in methods and apparatus for producing highly dispersed gases in liquids, and particularly to the colloidal dispersion of gases in liquids in which they are substantially insoluble.

Dispersion systems are characterized, among other factors, by the high specific boundary surface between the dispersion medium and the disperse phase. The boundary surface increases with an increasing degree of dispersiveness. In the case of positive surface tension an inwardly directed surface pressure exists at curved boundary surfaces. This surface is proportional to the boundary surface tension and increases when the curvature increases. The difficulty in producing colloidal dispersions of gases lies in the high surface pressure to which the individual gas bubbles are subjected. According to the degree of dispersiveness and the tension in the boundary surfaces that pressure may be from several hundred up to several thousand atmospheres. In the case of the condensed phase (that is, liquid or solid) the surface pressure has not such a great effect, since most properties of such systems depend only slightly on the pressure. The situation is different when the disperse phase is gaseous. With gases the pressure is of considerable influence on the properties, especially on volume and density. The difficulty of producing and stabilizing such systems is related to these phenomena.

The methods heretofore known for producing gas dispersions have generally involved mechanical distribution in which the gas entered a stirred or unstirred dispersion medium through, for instance, a porous diaphragm. Such methods do not produce gaseous bubbles of colloidal dimensions, since the openings in commercial diaphragms are not small enough and, if of sufficient fineness, would become clogged very quickly. So-called "condensation methods", based on the differences in solubility of the two phases in each other, also have been proposed for dispersing gases in liquids. These methods are difficult to control. Further, one is limited in selecting a suitable dispersion medium. Similar considerations apply to other condensation methods in which the gas phase is produced by the elements of the supersaturation or by means of chemical, electrochemical, photochemical or biological reactions. These considerations also apply to other mechanical dispersion methods in which jet pumps, Venturi tubes, and the like are used.

In accordance with the present invention a gas to be dispersed is in a highly rarefied or attenuated state during the dispersion process, that is to say, it is under a considerably decreased total or partial pressure. When the dispersion of the gas has been completed the rarefied state is eliminated, whereby the degree of dispersion of the gas is raised.

The rarefaction may be attained, for example, by reducing the pressure of the gas to be dispersed or by rarefying with gaseous dispersion media which serve to reduce the partial pressure of the gas. In the latter method the diluent gaseous medium is condensed during or after the dispersion. In many cases both methods may be employed simultaneously. One may operate at a reduced pressure and at the same time rarefy the gas to be dispersed by adding a suitable quantity of dispersion medium in vapor state.

There are also applications where it may be desirable to effect attenuation with other gases instead of with gaseous dispersion media of the kind above described, for example with a molecular-disperse gas soluble in the dispersion means or with the vapor of a liquid which is miscible with the dispersion medium.

In all of the methods which may be employed in carrying the present invention into effect there exists, during the dispersion process, a partial or a total pressure of the gas which lies considerably below the utilization pressure of the disperse system. If, after the production of the disperse system under reduced pressure, that system is raised to the higher pressure of utilization, a subsequent increase in the dispersiveness will be attained.

The degree of rarefaction to be selected in operating practice depends upon the degree of dispersiveness desired, upon the method selected for dispersing the gas, upon the existing tension of the boundary surfaces, and on the pressure of utilization of the disperse system. The degree of rarefaction in most cases will be from 1:100 to 1:1000, but the limits may lie far therebeyond.

In practicing the present invention I may utilize a dispersion device such, for example, as an agitator, turbo-mixer, or the like, which under normal conditions can produce gas bubbles having a diameter of, for instance, 0.1 mm. To such a device I pass a gas under substantially reduced pressure. The gas to be dispersed is assumed to be insoluble in the body of liquid in which it is to be dispersed or, in any event, the liquid is assumed to be saturated with respect to said gas so that no more of such gas is soluble therein. Under the assumed conditions one obtains initially a dispersion of gas bubbles of 0.1 mm. diameter, but with the gas under, say, 0.01 atmospheres pressure. As this system comes under atmospheric pressure, and this in general must occur very quickly because of the evanescence of the product, then in the case under consideration the gas bubbles will be reduced in diameter in a ratio of 1:100, to which is still added the above-mentioned action of the surface pressure which tends in the same direction.

The dispersion process itself generally consists of a difformation of the gas bubble, which then becomes unstable and disintegrates. (Changes in the shape of bodies are called "deformation" when the specific surface area increases but slightly while they are called "difformation" when the specific surface area increases greatly. For a more complete definition and discussion of difformation systems see the article by Wo. Ostwald in Kolloid-Z., 55, 257 (1931).) In the large majority of cases the difformation is caused by a velocity drop in the dispersion medium which is in a state of laminar or turbulent flow. Agitators, rotating disintegrators, jet pumps, Venturi tubes, etc., are devices which are capable of producing, with varying efficiencies, such a velocity drop. The rarefaction of the gas may be accomplished by introducing vapor from an external source or vapor volatilized from the liquid dispersion medium, by decreasing the total gas pressure, or, in certain cases, by a combination of such methods. The underpressure can be obtained by means of a separate vacuum, in which case the gas pressure in the distributor is reduced by a suitable pumping device during the dispersion process. Or, a kinetic underpressure may be produced by the fluid flow. Jet pumps, injectors, Venturi tubes, etc., are devices by means of which it is possible, when the gas supply is sufficiently throttled, to produce kinetically an underpressure in the added gas phase. Because of the above mentioned velocity drop such devices may function simultaneously as distributors.

In order to make my invention more clear, I refer to the accompanying drawings representing diagrammatically and by way of example a plurality of forms of apparatus for carrying out my improved process in different ways. Figs. 1 to 9 all are vertical sections of various kinds of apparatus suitable for use in practicing the present invention. It will be understood, of course, by those skilled in the art that suitable regulating devices such as flow meters, valves, gauges and the like (not shown in the figures) are provided for regulating and varying the conditions of operation.

Referring to Fig. 1 which shows the simplest constructional form of an apparatus, the numeral 1 denotes a vessel in which, for instance, water is boiled to form a vaporous dispersion medium (steam). This vapor passes to a condensing vessel 2 through a line 36. The vapor is condensed in vessel 2, for example with the aid of suitable cooling medium (not shown). The numeral 3 denotes a vessel containing the gas to be dispersed. This gas is introduced in a regulable manner and in a highly diluted state, for instance in a volume ratio of 1 part of gas to 1000 parts of vaporous dispersion medium, into the line 36 through a branch line 37 provided with a suitable regulating device (not shown) and is mixed with the vaporous diluent in the region 38. In this way a highly dispersed gas is produced in the vessel 2, particularly if a device such, for instance, as a pump 39 is installed in the line 36 between the vessels 2 and 3 so as to provide a more intense mixing of the gas to be dispersed with the vaporous dispersion medium. Without such a pump which may be, for example, of the type of a water-jet pump or a Venturi nozzle or the like, the apparatus will function effectively at atmospheric pressure. However, other conditions remaining the same, the apparatus will be more effective with respect to the attained degree of dispersiveness if an additional underpressure is utilized during the dispersion. When the disperse gaseous phase disappears after a certain length of time, for instance as a result of chemical reaction (for example, hydration, oxidation, etc.) with the dispersion medium, then it is possible to carry out the process in a cycle.

Figure 2:
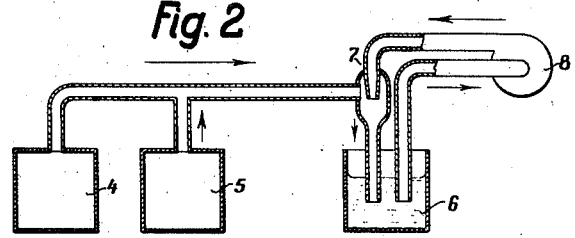

Fig. 2 shows an arrangement somewhat similar to that of Fig. 1, but differs therefrom by including means for circulating a liquid dispersion medium to a jet device, so that the rarefied or diluted gas to be dispersed is introduced under substantially reduced pressure into the liquid dispersion medium. The vessels 4, 5 and 6 correspond respectively to the vessels 1, 3 and 2 of Fig. 1. The numeral 7 denotes a water-jet pump and the numeral 8, a circulating pump. The condensed dispersion medium is drawn from the vessel 6 by the circulating pump 8 and forced through the water-jet pump 7. A stream of vaporous dispersion medium from the vessel 4 passes through a suitable conduit to the jet pump 7. A gas to be dispersed is introduced in limited regulable amount from the vessel 5 into the said stream of vaporous dispersion medium. The thus rarefied gas is drawn under substantially reduced pressure into the water-jet pump 7 where it is dispersed in the liquid dispersion medium being withdrawn from, and discharged into the vessel 6 by the circulating pump 8. Upon restoration in the vessel 6 of the normal atmospheric pressure on the liquid dispersion medium containing dispersed gaseous bubbles under subatmospheric pressure, the said bubbles are further reduced in size by reason of the rise in pressure, as hereinbefore has been described.

Figure 3:
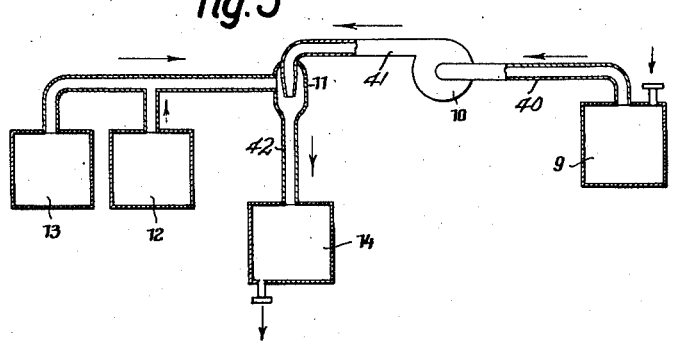

Fig. 3 represents a modification of the arrangement shown in Fig. 2, a separate vessel being provided for the liquid dispersion medium. As shown, the liquid dispersion medium is drawn from the vessel 9 through the line 40 by means of a pump such, for example, as a rotary pump 10, and thence through the line 41 to the water-jet pump 11. The vessels 12 and 13 correspond respectively to the vessels 5 and 4 of Fig. 2. The gas to be dispersed from the vessel 12 is diluted with vaporous dispersion medium from the vessel 13, and the mixture is drawn under reduced pressure into the water-jet pump 11 as above described with reference to Fig. 2. The liquid dispersion medium containing dispersed gaseous bubbles under subatmospheric pressure passes from the jet pump 11 to the vessel 14 through the line 42.

Figure 4:
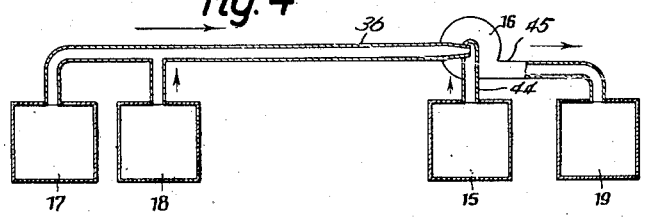

Instead of the jet-pump 11 a rotary pump may be used. Fig. 4 illustrates such an arrangement. The vessels 17 and 18 correspond respectively to the vessels 4 and 5 of Fig. 2, the former containing the vaporous dispersion medium and the latter, the gas to be dispersed. The rarefied gas is conducted through the line 36 to the center portion of the rotary pump 16, which serves both as a mixing pump and as a conveying pump. The vessel 15 contains a liquid dispersion medium which is withdrawn through the line 44 by the pump 16. The gas to be dispersed, diluted with vaporous dispersion medium, is mixed in the pump 16 with the liquid dispersion medium from the vessel 15. The liquid, which now contains dispersed gaseous bubbles under subatmospheric pressure, passes through the line 45 into the vessel 19, wherein normal atmospheric pressure prevails. As a result, the said gaseous bubbles are further reduced in size as they attain atmospheric pressure. If desired, the liquid with colloidally dispersed gaseous bubbles therein may be returned to the vessel 15 (through a line not shown) and be recirculated two or more times through this vessel and the pump 16 in order to increase the concentration of the dispersed gas in the liquid.

An arrangement wherein the gas to be dispersed and the liquid dispersion medium are separately brought to, and mixed in, a jet pump is shown in Fig. 5. From the vessel 20 a liquid dispersion medium is drawn by a rotary pump 21 through the line 47 and is forced by said pump through the line 48 to the jet pump 22. In this jet pump the dispersion medium is mixed with the gas to be dispersed, arriving under subatmospheric pressure from the vessel 23 through the line 50. The disperse mixture passes through the line 49 to the vessel 24. Or, if desired, the mixture may be returned to the vessel 20 (through a line not shown) and recirculated through the system until a desired concentration of gaseous bubbles of colloidal dimensions has been produced in the liquid dispersion medium.

In Fig. 6 is shown an arrangement whereby, for instance, air bubbles of colloidal dimensions can be dispersed in water. The numeral 25 denotes a vessel containing water. A rotary pump 26 draws the water from the vessel 25 and forces it through the pipe 51 to the jet pump 27, the suction branch of which communicates with the atmosphere by the intermediary of a capillary tube 28. Connected to this tube is a vacuum gauge 29. By operating a suitable regulating device or valve (not shown) in the tube 28 air under subatmospheric pressure is drawn through the said tube into the jet pump 27 where it is dispersed in the water from the vessel 25. The gauge 29 may show, for example, a vacuum corresponding to 20 mm. of mercury when a valve in the tube 28 is closed. However, if such valve is opened so that a vacuum corresponding to, for instance, 25 to 30 mm. of mercury is obtained, then the air entering the jet pump 27 will be under a partial pressure of approximately 0.01 atmosphere. Instead of the capillary tube 28 any other pressure-reducing device may be used.

In the modification shown in Fig. 7 the conveying pump 30 also serves as the mixing pump. The pump 30 withdraws water or other liquid dispersion agent from the vessel 31 and discharges it into the vessel 32. By operating a suitable regulating device (not shown) in the capillary tube 33, air under subatmospheric pressure is drawn into the center portion of the pump 30, where it is dispersed in the liquid dispersion medium being pumped to the vessel 32. The higher the vacuum under which the air is drawn into the pump 30, the smaller will be the gaseous bubbles distributed in the liquid dispersion medium.

Fig. 8 shows an arrangement whereby the gas to be dispersed is introduced directly into the system as the gas is produced, for example from an electrolytic cell, instead of being withdrawn from a storage vessel. The arrangement shown in the left side of the figure is the same as in Fig. 6, but at the right, instead of a capillary tube 28 (Fig. 6), an electrolytic apparatus 34 is illustrated. In such an arrangement, the line 52 of the apparatus 34 likewise must be connected to a member or means in which a pressure below atmospheric exists. By suitable regulation of the electric current it is possible to control the generation of the gas to be dispersed. The freshly generated gas under subatmospheric pressure is mixed under controlled conditions in the jet pump with the liquid dispersion medium.

It is also possible to subject the gas to be dispersed to other electric influences. For example, air may be ozonized by a silent discharge prior to being dispersed and the ozonized air may be colloidally distributed in a liquid dispersion medium such as water. Or, the air may be treated with arc discharges to form nitrous oxides and the resulting gas then may be dispersed in colloidal state in a suitable dispersion medium.

Fig. 9 illustrates an arrangement for producing and dispersing ozonized air in colloidal state in water. The numeral 35 denotes a device for the production of ozone, air being drawn into said device under subatmospheric pressure through the capillary tube 53. If desired, the air may be introduced to the ozonator under normal atmospheric pressure and the ozonized air may be passed through a capillary tube before being mixed with the liquid dispersion medium; that is to say, the relative positions of ozonator 35 and capillary tube 53 may be reversed, as desired or as may be required.

The colloidal dispersions produced in accordance with the present invention may be subjected, if desired, to an electric treatment such, for instance, as to a silient discharge or to very high frequencies. The dispersions may be stabilized by the addition of protective colloids or emulsifying agents such as soaps and the like. In order to obviate or to lessen an outward diffusion of the dispersed gas from the liquid dispersion medium, the liquid with gaseous bubbles of colloidal dimensions distributed therethrough may be subjected to superatmospheric pressure. The same gas or gaseous mixture which is dispersed in the liquid medium may constitute the atmosphere in which the liquid is maintained at a pressure above atmospheric.

The applications of the invention, various embodiments of which have been above described, are many. For instance, one can carry out oxidizing reactions, hydrogenation of gases and liquids, chemical reactions between water and gases, or chemical or biological reactions which the dispersive phase carries out either alone or in conjunction with the dispersion medium. Oxidations can be effected with colloidally dispersed oxygen or air; likewise, reductions or hydrogenations, with colloidally dispersed hydrogen. The methods also are applicable in carrying out reactions requiring a high gas pressure, with or without the aid of catalysts, and at a normal or only slightly increased exterior pressure. Another application is the production of gaseous dispersions in solid bodies, which in molten or dissolved state are adapted to serve as a liquid dispersion medium. Similarly gaseous dispersions may be formed in bodies which initially are in a liquid state but which subsequently may be caused to congeal or solidify by chemical reaction such, for example, as by condensation, polymerization or the like. In this way gaseous bubbles of colloidal dimensions may be incorporated in nearly all known plastic masses and correspondingly alter their mechanical, thermal and electrical properties.

With methods such as hereinbefore described it is possible not only to produce dispersions of gases in liquids of any degree of dispersiveness but also, in certain cases, to produce emulsions of the oil-in-water or water-in-oil types, depending upon which phase is in gaseous state during the dispersion process. In carrying out one method of producing such emulsions care must be taken that the gas to be dispersed is condensed into a liquid under the temperature-pressure conditions which are newly created after the distribution. Emulsions also can be produced by first bringing the liquid to be emulsified, or the solid material to be distributed, to vapor state and by treating it in this state analogous to a gas which is to be dispersed.

In order that my invention better may be understood by those skilled in the art the following more specific examples of applications thereof are given:

Example 1

Fifty kilograms of linseed oil are emulsified with 100 liters of water to which any suitable emulsifying agent, for example Turkish red oil, has been added. This emulsion is oxidized in an arrangement such as shown, for example, in Fig. 5, by means of finely distributed oxygen. The lower amount of oxygen which is introduced into the system is 1 cubic meter per hour at a partial pressure of about 0.001 atmosphere. The iodine number of the linseed oil drops from 175 for the original material to 128 after three hours' treatment, and to 100 after six hours' treatment. After about 8 to 10 hours the emulsion breaks down and no longer absorbs oxygen. The linseed oil has been changed into linoxyn, which can be separated by filtration and drying. A clear, slightly yellow linoxyn is obtained in a rapid, efficient manner. The method of this invention may be used to produce at higher temperatures so-called "black oil" from linseed oil or less highly oxidized linseed oil at lower temperatures. In all cases the velocity of reaction is from 10 to 100 times that attained with methods heretofore known.

Example 2

Four hundred grams of cod-liver oil were emulsified with 1000 grams of water containing a suitable emulsifying agent such, for instance, as 1 gram of Turkish red oil and 1 gram of washing powder. This emulsion was oxidized at a temperature of 70° to 80° C. in an arrangement such as shown, for example, in Fig. 5, using as a catalyst for the reaction 1 per cent by weight of lead manganese resinate and introducing oxygen into the emulsion at the rate of about 100 liters per hour. The iodine number (Hanus method) of the original cod-liver oil was 142.5. The progress of the oxidation was observed by determination of the iodine number of the dehydrated cod-liver oil separated from the emulsion. At the end of 2 hours the oil showed an iodine number of 77.6 and at the end of 4 hours, an iodine number of 59.2. There was no substantial change in the iodine number of the oil at the end of 10 hours as compared with its iodine number after 4 hours' oxidation. The water which separated from the emulsion was drawn off, and the cod-liver oil, containing about 43 per cent water, was dehydrated under vacuum. The oxidized cod-liver oil contained 17.9 per cent hydroxy fatty acids, as compared with 1.8 per cent hydroxy fatty acids in the original oil.

The process can be used in a similar manner for other chemical reactions, for instance, for oxidizing paraffin into fatty acids, the chlorination of benzol, the hardening of fish oils by hydrogen, the hydrogenation of oils and liquid carbon derivatives, and for effecting chemical reactions between water and acetylene so as to form acetaldehyde.

Example 3

One thousand liters of a 0.1 saponin solution is employed as a liquid dispersion medium in an arrangement such as shown, for example, in Fig. 6. Air under a pressure of 0.05 atmospheres is introduced into this medium at the rate of 1 to 10 cubic meters per hour, depending upon the size of the injector employed. In this manner an exceedingly well dispersed solid foam is obtained. Such foam can be applied with suitable binders, such as plaster of Paris, cement or organic substance, to the production of light structural materials, or it may be employed in connection with ore flotation processes.

What I claim as new and desire to secure by Letters Patent of the United States is:

1. The method which comprises mixing a gas under reduced pressure with a flowing stream of non-solvent liquid at a higher pressure, accumulating the resulting liquid at a pressure lower than the pressure on the liquid during mixing of the said gas therewith, and introducing into a flowing stream of the said liquid containing dispersed gas a further amount of gas at a pressure substantially below the pressure on the said liquid.

2. The method of colloidally dispersing a gas in a liquid in which said gas is substantially insoluble consisting in introducing said gas in such liquid in the form of fine bubbles of said gas mixed with vapor and while at a pressure substantially less than the normal pressure exerted on said liquid, whereby the pressure on said bubbles is substantially increased, and after the dispersion has been effected condensing said vapor.

3. The method of forming a colloidal dispersion of a gas in a non-solvent liquid which comprises highly diluting said gas with a vaporous dispersion medium, introducing the thus diluted gas into the said liquid in the form of fine bubbles while maintaining the said diluted gas at a pressure less than the normal pressure exerted on said liquid and thereupon causing normal pressure to be established on the said gas bubbles.

4. The method of forming a colloidal dispersion of a gas in a non-solvent liquid which consists in introducing said gas in such liquid in the form of fine bubbles of said gas mixed with vapor and while at a pressure not materially in excess of one hundredth of an atmosphere, and causing said vapor to be condensed and the pressure of the dispersed gas to be increased.

5. The method of dispersing a gas in a liquid in which said gas is substantially insoluble which consists in introducing said gas in such liquid in the form of fine bubbles of said gas mixed with vapor, said bubbles being at a pressure not materially in excess of one hundredth of an atmosphere and said liquid being at a materially higher pressure.

6. The method of manufacturing solid bodies containing gaseous bubbles of colloidal dimensions dispersed therein which consists in dispersing a desired gas at partial atmospheric pressure in the material of the solid body while said material is liquefied and causing the resulting product to be solidified.

7. A gas dispersion apparatus comprising the combination of means for supplying a gas to be dispersed, means for supplying a dispersing vapor thereto, a conduit connected in receiving relation at one end to both said supply means, a container for a dispersing liquid, means for operating the system consisting of supply and receiving containers and connecting conduits under subnormal pressure and means for restoring normal pressure in said system upon admixture of the gas to be dispersed with a dispersing liquid.

8. An apparatus for dispersing gas in a liquid medium comprising the combination of a container for the dispersing medium, means for supplying the gas to be dispersed, means for supplying a dispersing vapor, a conduit connected to convey said gas and dispersing vapor to said container, means including a jet pump for operating the system consisting of supply and receiving containers and connecting conduits under subnormal pressure and means for restoring normal pressure in said system upon admixture of the gas to be dispersed with a dispersing liquid.

9. The method of dispersing a gas in a liquid in which said gas is substantially insoluble which comprises highly diluting the gas with a vapor, introducing the resulting mixture into the said liquid in the form of fine bubbles of gas mixed with vapor and while the said mixture is at a pressure not materially in excess of one hundredth of an atmosphere and the said liquid is at a pressure materially in excess of one hundredth of an atmosphere, and condensing the vapor.

10. A method as in claim 6 wherein the gas is dispersed in the liquefied material while at a pressure not materially in excess of one hundredth of an atmosphere.

11. A method as in claim 6 wherein the gas is dispersed in the liquefied material while at a pressure within the range of 0.01 to 0.001 atmospheres.

12. The method which comprises mixing a gas while under a pressure not materially exceeding one hundredth of an atmosphere with a flowing stream of non-solvent liquid at a higher pressure, accumulating the resulting liquid at a pressure lower than the pressure on the liquid during mixing of the said gas therewith, and introducing into a flowing stream of the said liquid containing dispersed gas a further amount of gas at a pressure not materially in excess of one hundredth of an atmosphere.

RUDOLF AUERBACH.